United States Patent [19]

Jones

[11] Patent Number: 4,570,333
[45] Date of Patent: Feb. 18, 1986

[54] METHOD OF MAKING A PERMANENT MAGNET ROTOR

[75] Inventor: Donald W. Jones, Burnt Hills, N.Y.

[73] Assignee: General Electric Company, Schenectady, N.Y.

[21] Appl. No.: 639,883

[22] Filed: Aug. 13, 1984

Related U.S. Application Data

[62] Division of Ser. No. 546,235, Oct. 28, 1983, Pat. No. 4,486,679.

[51] Int. Cl.⁴ ............................................ H02K 15/02
[52] U.S. Cl. .......................................... 29/598; 29/515
[58] Field of Search ................... 29/598, 515; 310/42, 310/156, 216, 217, 218, 261, 183

[56] References Cited

U.S. PATENT DOCUMENTS 4,358,697 11/1982 Liu et al. ............................. 310/156
4,434,546 3/1984 Hershberger .................. 310/156 X

*Primary Examiner*—Carl E. Hall
*Attorney, Agent, or Firm*—Mark L. Mollon; James C. Davis, Jr.; Marvin Snyder

[57] ABSTRACT

A permanent magnet rotor is provided having a stack of disk laminations, each of the laminations having a plurality of pole piece sections connected to one another by circumferential bridges situated on the disk periphery. Radial ligaments connect the core portion of the disk to the bridges. The core portion and pole piece sections define the radial thickness of the magnet slots. Magnets are situated in the magnet slots and the bridge positions of the rotor are inwardly deformed causing the radial ligaments to collapse, thereby holding the magnets in their respective slots.

9 Claims, 5 Drawing Figures

METHOD OF MAKING A PERMANENT MAGNET ROTOR

This application is a division, of application Ser. No. 546,235, filed 10/28/83 now U.S. Pat. No. 4,486,679, issued 12/4/84.

BACKGROUND OF THE INVENTION

This invention relates to permanent magnet dynamo electric machines and more specifically to permanent magnet dynamo electric machines with the permanent magnets located in the interior of the rotor.

Alternating current electric motors and generators are sometimes excited or magnetized by means of permanent magnets because this leads to machines of simple, robust construction having high efficiency and being free of slip rings or commutators.

There is a need for adequate mechanical support of the permanent magnets situated in the interior of the rotor of a permanent magnet machine. The magnets, as well as the surrounding structures are subject to various systems of forces arising from thermal expansion, rotation and residual forces caused by the manufacturing process, such as distortion due to welding. The magnet material is often Alnico, ferrite, rare earth-cobalt, or manganese-aluminum. Most of these materials are hard to machine, and therefore it is economically desirable to be able to assemble magnets that have irregular surfaces rather than close tolerance ground surfaces. Many of the useful magnet materials are quite brittle. It is necessary to mount such magnets in laminated rotor structures in a way that will resist loosening due to vibration, centrifugal forces, temperature excursions and be compatible with mass production techniques.

In previous permanent magnet rotor designs, such as the one shown in Richter's U.S. Pat. No. 4,117,360, issued Sept. 26, 1978, and assigned to the instant assignee, a composite shrink ring of magnetic and non-magnetic pieces welded together is used to hold the magnet and the remaining rotor assembly. The pole pieces and rotor assembly are solid pieces of magnetic material.

In the copending application of Miller et al., Ser. No. 315,333, filed Oct. 26, 1981, and assigned to the instant assignee, now U.S. Pat. No. 4,417,168, issued Nov. 22, 1983, a prism of magnetic material separated along a plane parallel to a flux line has a planar spring disposed between the sections to force the "V" arranged magnets against the pole pieces.

In U.S. Pat. No. 4,464,596, issued Aug. 7, 1984, which is a continuation-in-part application of Miller et al., Ser. No. 453,665, filed Dec. 27, 1982, and assigned to the instant assignee, north and south pole pieces are separated by clamp pieces to form a hollow cylinder. A shaft of magnetic material with a central portion of rhombic cross section is positioned in the cylinder. As bolts extending through the clamp pieces engage matching surfaces on the edges of the pole pieces, the pole pieces are drawn toward the shaft, and in doing so clamp the magnets located adjacent the sides of the magnet in compression to form a solid structure.

In the copending application of Miller et al., Ser. No. 453,666, filed Dec. 27, 1982, and assigned to the instant assignee now U.S. Pat. No. 4,480,207, issued Oct. 30, 1984, a permanent magnet rotor has a north and south pole each separated into two sections by a central non-magnetic insert. The pole piece sections are welded to the central nonmagnetic insert, and two nonmagnetic segments are welded to either end of the south pole piece to form two half rings. The half rings are secured about a solid shaft of magnetic material having a central portion with a rhombic cross section. The central line of the half rings is aligned with the diagonal of the rhombic central portion. The half rings are bolted to one another. The sides of the shaft and the inner faces of the half rings form four apertures extending the axial length of the pole pieces. A magnet which adds no structural strength to the rotor is positioned in each of the apertures, respectively.

It is an object of the present invention to provide a rotor for a permanent magnet machine which can be fabricated by standard manufacturing processes such as punching and pressing and requires a minimum of machining.

It is another object of the present invention to provide a rotor which allows easy insertion of magnets in their respective slots and subsequently adjusts each lamination to the local tolerance of the magnet thickness.

It is a further object of the present invention to provide a rotor for a permanent magnet machine that does not require bolts extending in the radial direction to provide radial tightening.

SUMMARY OF THE INVENTION

In one aspect of the present invention a rotor for a permanent magnet machine is provided comprising a stack of disk laminations, each of the laminations having a plurality of pole piece sections connected to one another by circumferential bridges situated at the disk periphery. Radial ligaments connect the core portion of the disk to the bridges. The core portion and pole piece sections define the radial thickness of the magnet slots. The disk laminations are stacked so that the magnet slots in each disk are aligned and define an axial passageway therethrough. Magnets are situated in each of the magnet slots. The bridges are inwardly deformed and the ligaments are columnarly collapsed to provide predetermined hoop stress around the circumference of the disk to hold the magnets in the slots.

In another aspect of the present invention, a method of making a rotor for a permanent magnet machine is provided comprising the steps of first forming a stack of a plurality of disk laminations. Each disk lamination includes pole piece sections connected by circumferential bridges located at the disk periphery, with the pole piece sections and interior core portion defining the radial thickness of the magnet slots. Radial ligaments situated on each disk connect the interior portion of the disk lamination to the circumferential bridges. The disks located in the stack are aligned so that the magnet slots extend through the stack in the axial direction. Next, the magnets are placed in the magnet slots. The bridges are then pressed inwardly, plastically deforming the bridges and ligaments, creating a predetermined hoop stress when the pressing force is removed so as to hold the magnets in their respective slots.

In still another aspect of the present invention, a rotor for a permanent magnet machine is provided comprising a stack of disk laminations, each of the laminations having a plurality of pole piece sections connected to one another by circumferential bridges situated at the disk periphery. Radial ligaments connect the core portion of the disk to the bridges. The radial ligaments are positioned asymmetrically along the quadrature axes of the rotor, with the laminations in the stack arranged so that adjacent ligaments in adjacent laminations are located at least partially on different sides of the quadrature axes, forming a central aperture along the quadrature axes in the axial direction. The pole pieces and core portion define the radial thickness of the magnet slots. The laminations are aligned so that the magnet slots define a passageway through the stack in the axial direction. Magnets are situated in the magnet slots and nonmagnetic pins are situated in the central apertures formed by the radial ligaments, plastically deforming the radial ligaments and bridges, providing a predetermined hoop stress around the circumference of the disks to hold the magnets in their respective slots.

In yet another aspect of the present invention, a method of making a rotor for a permanent magnet machine comprises the steps of first stacking a plurality of disk laminations, each disk lamination having pole piece sections connected by circumferential bridges located on the disk periphery. The pole piece sections and an interior core portion define the magnet slot thickness in the radial direction. Radial ligaments connect the interior core portion to the circumferential bridges. The radial ligaments are positioned asymmetrically along the quadrature axes of the rotor, with the laminations in the stack arranged so that adjacent ligaments in adjacent laminations are located at least partially on different sides of the quadrature axes, forming a central aperture along the quadrature axes in the axial direction. Next, magnets are placed in the magnet slots, and then nonmagnetic pins are inserted in the central apertures, plastically deforming the radial ligaments and bridges, providing a predetermined hoop stress around the circumference of the disks to hold the magnets in their respective magnet slots.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

DETAILED DESCRIPTION OF THE INVENTION

Figure 1:
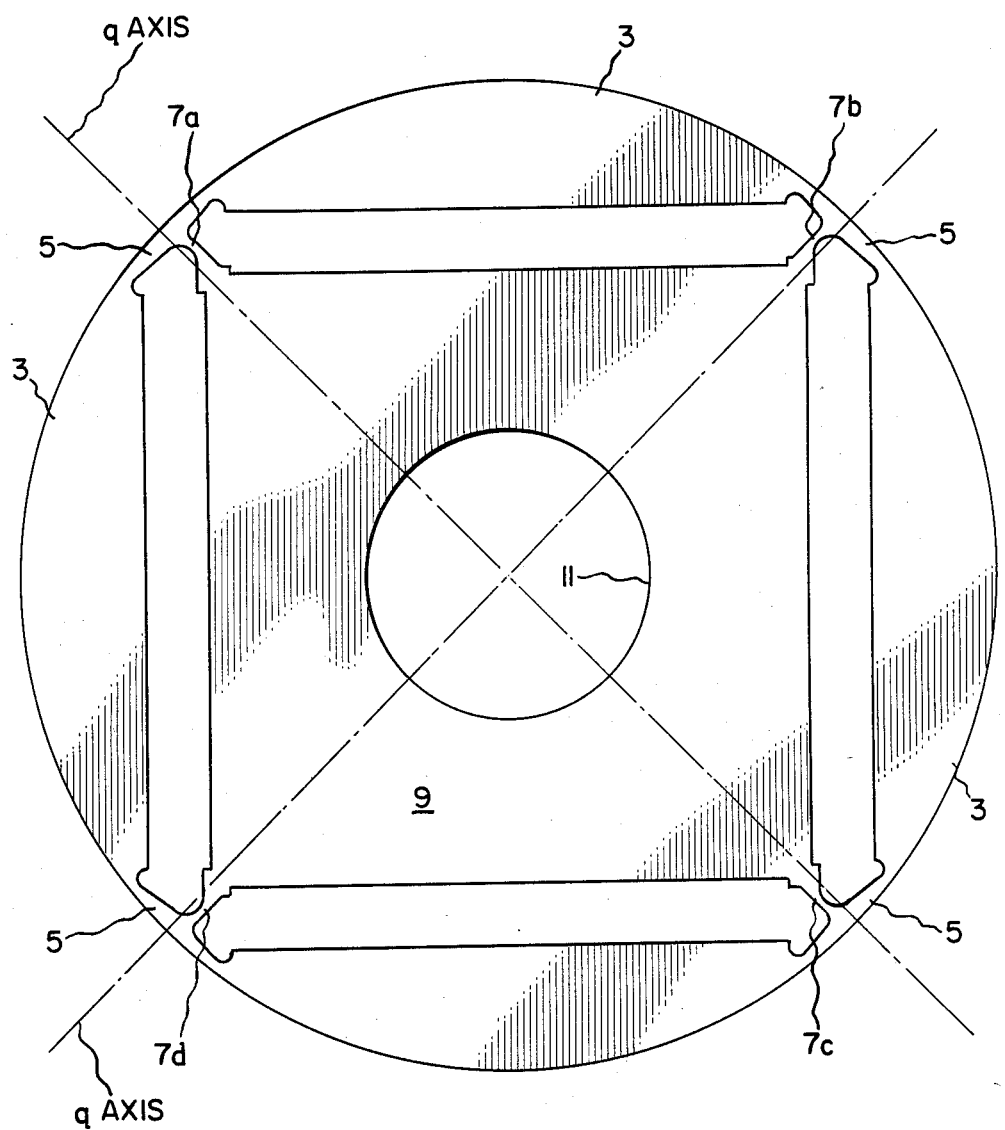
FIG. 1 illustrates a rotor lamination prior to assembly in a rotor in accordance with the present invention.

Referring now to the figures and especially FIG. 1 thereof, a rotor lamination for a four pole permanent magnet rotor prior to assembly is shown. The rotor lamination is a unitary disk 1 of magnetic material formed, for example, by stamping the laminations from a steel sheet, and comprises pole sections 3 separated from one another by circumferential bridges 5 located at the rotor periphery. Radial ligaments 7a, 7b, 7c and 7d located along the quadrature axes connect the bridge portions 5 to an interior core portion 9. The quadrature axis (q-axis) in a synchronous machine is the axis that represents the direction of the radial plane between adjacent poles of the rotor. The radial ligaments 7a–7d have an asymmetric shape relative to the quadrature axes. The inner core portion 9 and pole piece sections 3 define four magnet slots. An aperture 11 is provided at the center of the inner core portion for a shaft.

The radial ligaments are punched asymmetrically relative to the quadrature axes so that when the bridges 5 are pressed inwardly the ligaments 7a–7d will collapse in a predictable direction. In the present embodiment, one adjacent pair of ligaments 7a and 7b collapse towards one another and ligaments in the remaining adjacent pair 7c and 7d collapse towards one another.

Figure 2:
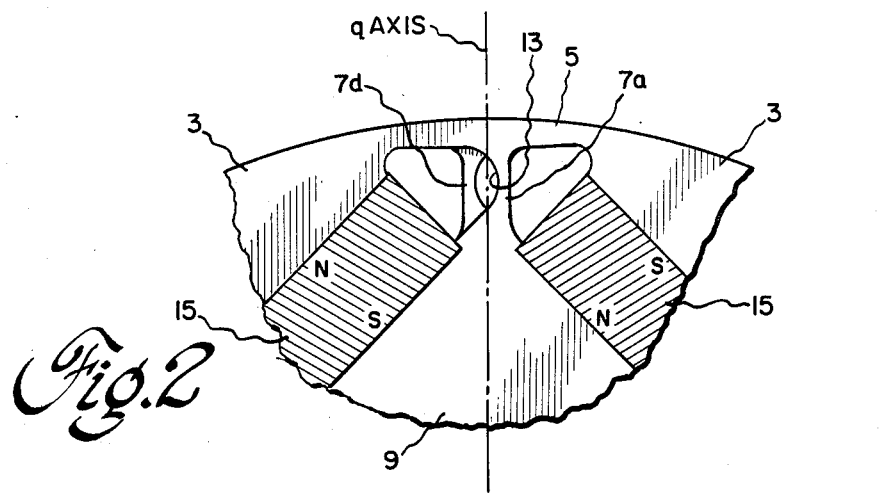
FIG. 2 is a partial sectional view of a rotor showing the radial ligaments.

Referring now to FIG. 2, a partial sectional view of a stack of rotor disk laminations is shown with each lamination either rotated 90° from the aligned position or flipped over relative to the lamination below and on top of it, resulting in a central aperture 13 extending in the axial direction and situated on the q-axis. The central aperture is a result of the asymmetry of the radial ligaments. The radial ligament 7a of the top lamination together with the radial ligament 7d of the lamination immediately under the top lamination (assuming 90° rotation of one disk relative to the other) can be seen. A shaft (not shown) is situated in the central aperture 11 of the lamination 1, as shown in FIG. 1. Magnets 15, shown in FIG. 2, are situated in each of the magnet slots and magnetized to form alternating north and south pole piece sections circumferentially around the disk.

Figure 3:
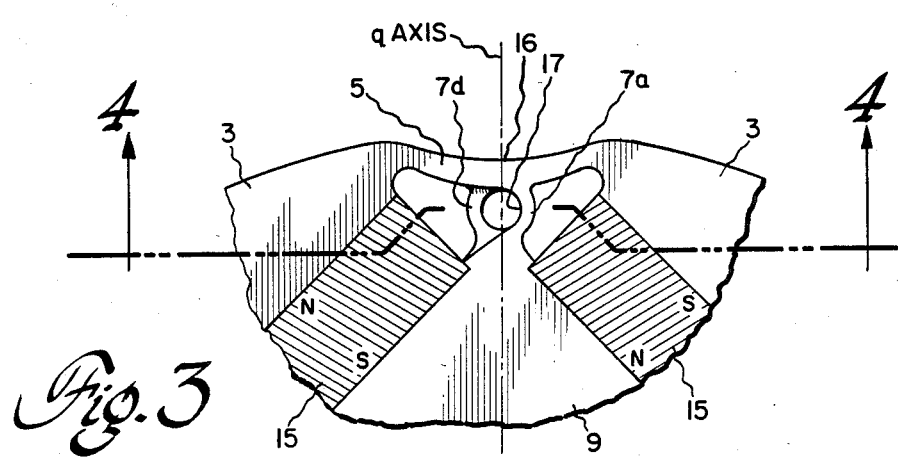
FIG. 3 is a partial sectional view of a rotor after inward pressure has been applied to the bridges, plastically deforming the bridges and radial ligaments.

A partial sectional view of the laminations after the bridges have been simultaneously pressed inwardly creating depression 16 is shown in FIG. 3. The inward force plastically deforms the bridges 5 and radial ligaments 7a–7d a predetermined amount sufficient that on relaxing the pressing forces, the desired hoop stress remains. The inward force may be applied, for example, by a press deforming all the bridges inwardly simultaneously. The desired hoop stress loads the pole piece sections 3 and magnets 15 with a radially inward force that exceeds the rotational centripetal force during rotor operation. The zero speed hoop tension is sufficient to avoid fatigue due to speed cycling of the rotor during operation. The inward pressing of the rotor bridges and resulting radial ligament collapse adjusts each lamination to the local tolerances of the magnet thickness, and provides enough clearance in the magnet slots prior to the bridge deformation to allow easy insertion of the magnets in their respective slots.

Figure 4:
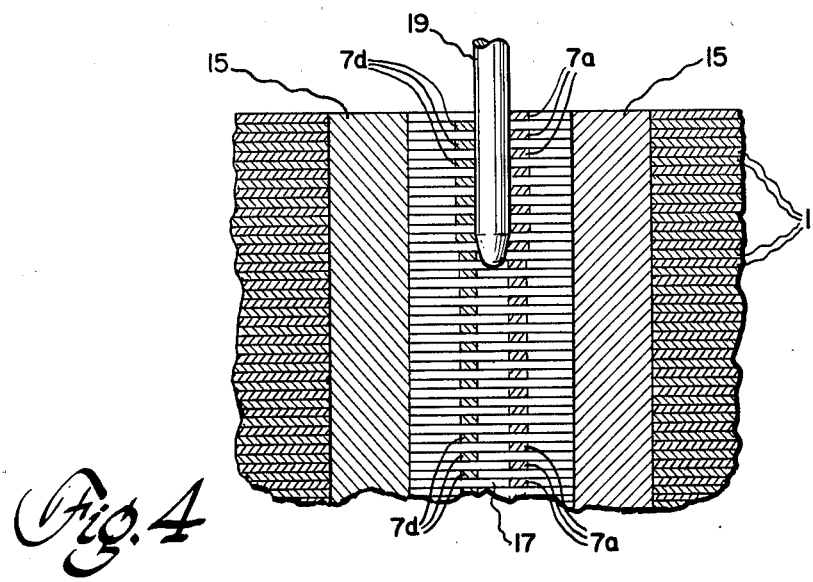
FIG. 4 is a sectional view along the lines 4—4 of FIG. 3 showing a nonmagnetic pin being inserted in a tunnel formed by the radial ligaments.

Referring now to FIGS. 3 and 4 the radial ligaments 7a–7d form a central tunnel 17 when they undergo columnar collapse due to the ligaments on adjacent disks collapsing in opposite radial directions. The structure of the collapsed ligaments can be locked in place by injecting molten metal such as aluminum in the voids primarily defined by the radial ligaments 7, core portion 9, bridges 5 and magnets 15. Alternatively, the structure can be locked in place by driving a nonmagnetic pin 19 with a tapered end into the tunnel, or by using both pins and injection molding. The nonmagnetic pin can be fabricated of austenitic stainless steel, for example. It may be necessary to press the bridges 5 inwardly during metal injection to maintain the desired pretension if nonmagnetic pins are not used.

Alternatively, the radial ligaments can be deformed by driving nonmagnetic pins into the central aperture 17 along the q-axis, without inwardly crushing the bridges by an external force, to create the desired hoop tension to hold the magnets securely in their respective slots.

Figure 5:
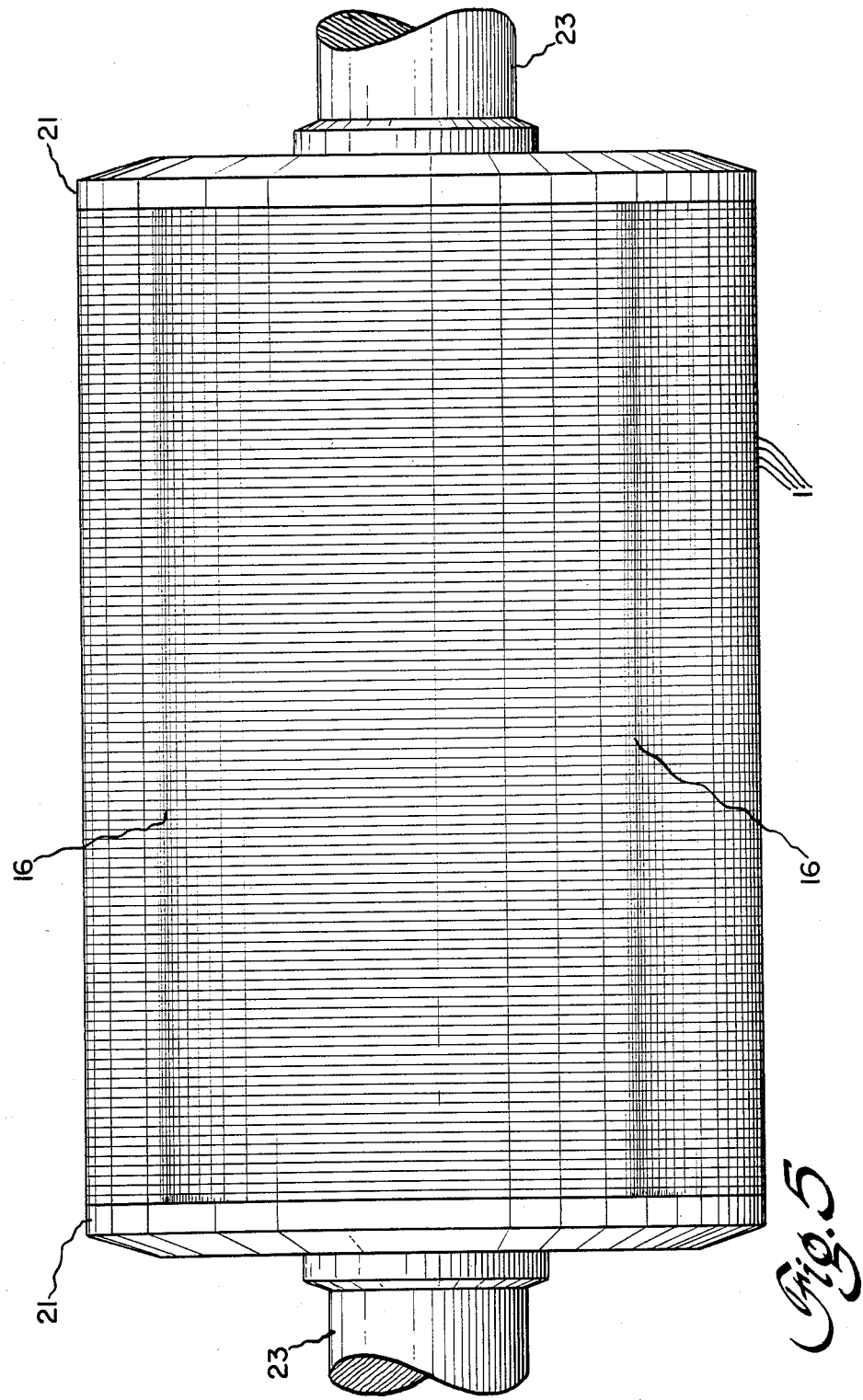
FIG. 5 is a side view of a rotor that has had its bridges pressed inwardly, plastically deforming the bridges and ligaments.

Referring now to FIG. 5, the axial containment of the rotor is accomplished by end rings 21 cast in place. These rings also provide the metal for balance adjustments and for fan blades if required. A shaft 23 is shown extending axially through the stack. Alternatively, end plates can be pressed on the shaft 23 on either end of the stack to provide axial containment of the rotor. Depressions 16 are shown on the surface of the rotor where the pressing forces were applied.

The foregoing describes a rotor for a permanent magnet dynamoelectric machine which can be fabricated by standard manufacturing processes such as punching and pressing and requires a minimum of machining. The rotor described does not require bolts extending in the radial direction to provide radial tightening of the magnets in their slots.

While the invention has been particularly shown and described with reference to several embodiments thereof, it will be understood by those skilled in the art that various changes in form or details may be made without departing from the spirit and scope of the invention.

What is claimed is:

1. A method of making a rotor for a permanent magnet machine comprising the steps of:
   stacking a plurality of disk laminations, each disk lamination having pole piece sections connected by circumferential bridges located on the disk periphery, said pole piece sections and an interior core portion defining magnet slot thicknesses in the radial direction, a radial ligament connecting the interior core portion to each of the circumferential bridges, respectively, each of said radial ligaments being rotationally displaced to either side of the quadrature axes of the rotor along the axial direction, said stack of laminations aligned so that said magnet slots extend through the stack in the axial direction;
   placing said magnets in the magnet slots; and
   pressing said bridges inwardly, plastically deforming said bridges and ligaments in a manner sufficient to create a predetermined hoop stress when the pressing force is removed, thereby holding said magnets in their respective slots, the rotational displacement of said radial ligaments ensuring columnar collapse in predetermined directions.

2. The method of claim 1 further comprising the step of injecting molten metal in any voids around the radial ligaments and forming end rings at each axial end of the stack of laminations to provide axial containment of the laminations.

3. A method of making a rotor for a permanent magnet machine comprising the steps of:
   stacking a plurality of disk laminations, each disk lamination having pole piece sections connected by circumferential bridges located on the disk periphery, said pole piece sections and an interior core portion defining the radial thickness of magnet slots, said laminations aligned so that said magnet slots define a passageway through the stack in the axial direction, said disk laminations having radial ligaments connecting the interior core portion to the circumferential bridges, said radial ligaments positioned asymmetrically along the quadrature axes of the rotor, said laminations in said stack arranged so that adjacent ligaments in adjacent laminations are located at least partially on different sides of the quadrature axes forming a central aperture along the quadrature axes in the axial direction;
   placing said magnets in the magnet slots; and
   inserting pins in said central apertures to plastically deform said radial ligaments and bridges, thereby providing a predetermined hoop stress around the circumference of the disks to hold said magnets in the respective magnet slots.

4. The method of claim 3 further comprising the step of injecting molten metal in voids around the radial ligaments and forming end rings at each axial end of the stack of laminations to provide axial containment of the laminations.

5. The method of claim 3 wherein said pins comprise nonmagnetic material.

6. A method of making a rotor for a permanent magnet machine comprising the steps of:
   stacking a plurality of disk laminations, each disk lamination having pole piece sections connected by circumferential bridges located on the disk periphery, said pole piece sections and an interior core portion defining magnet slot thicknesses in the radial direction, a radial ligament connecting the interior core portion to each of the circumferential bridges, respectively, said stack of laminations aligned so that said magnet slots extend through the stack in the axial direction and so that circumferentially-adjacent ligaments in axially-adjacent disks are adapted to collapse in opposite directions to define a tunnel in the axial direction between the ligaments;
   placing said magnets in the magnet slots; and
   pressing said bridges inwardly, plastically deforming said bridges and ligaments in a manner sufficient to create a predetermined hoop stress when the pressing force is removed, thereby holding said magnets in their respective slots.

7. The method of claim 6 further comprising the step of injecting molten metal in any voids around the radial ligaments and forming end rings at each axial end of the stack of laminations to provide axial containment of the laminations.

8. The method of claim 6 further comprising the step of placing a nonmagnetic pin in said tunnel after pressing said bridges inwardly.

9. The method of claim 7 further comprising the step of:
   placing a nonmagnetic pin in said tunnel prior to the step of injecting molten metal.

* * * * *